April 17, 1962   J. M. KLOVER ETAL   3,029,830
SERVO VALVE
Filed Nov. 6, 1957   3 Sheets-Sheet 1
Fig. I.
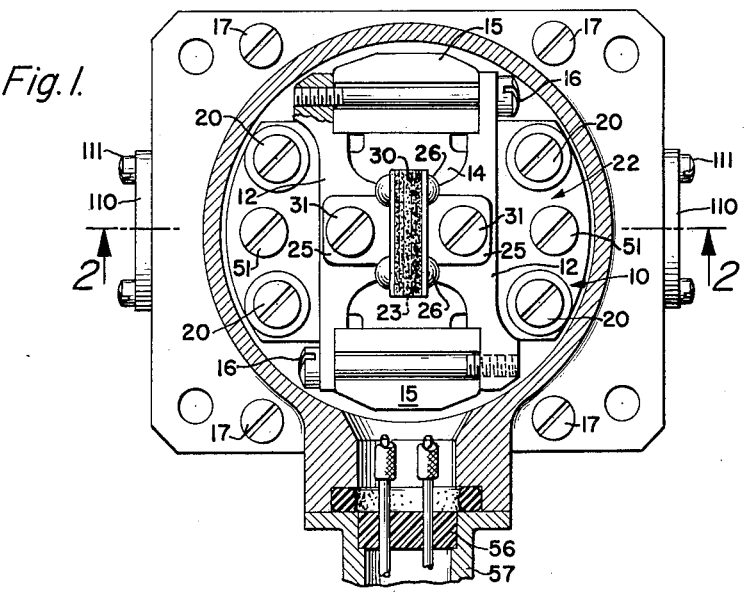
Fig. 2.
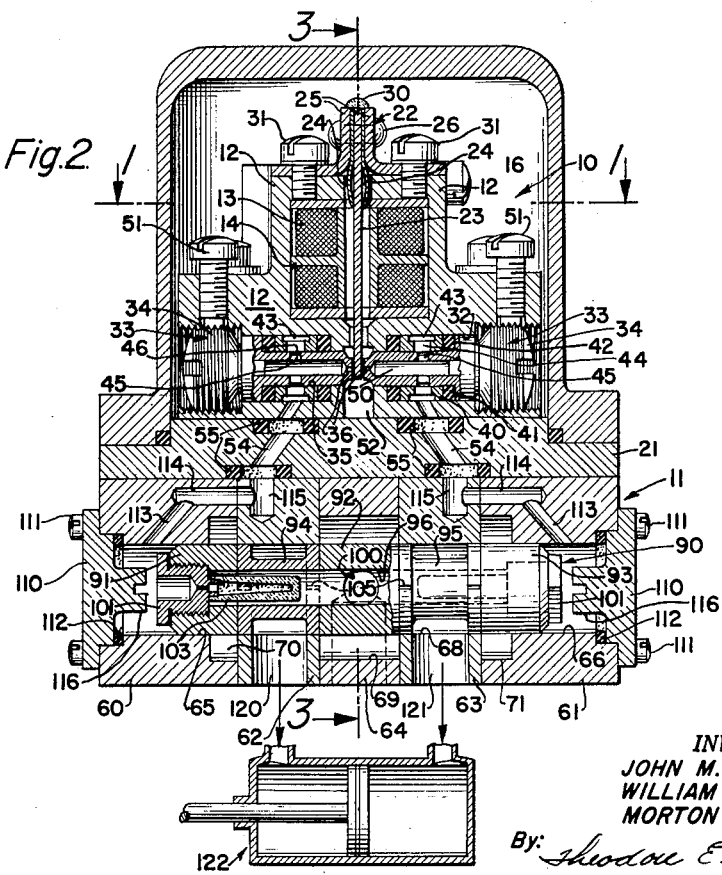
INVENTORS:
JOHN M. KLOVER,
WILLIAM E. MELBER,
MORTON E. MOORE.
By: Theodore E. Bieber
Attorney.

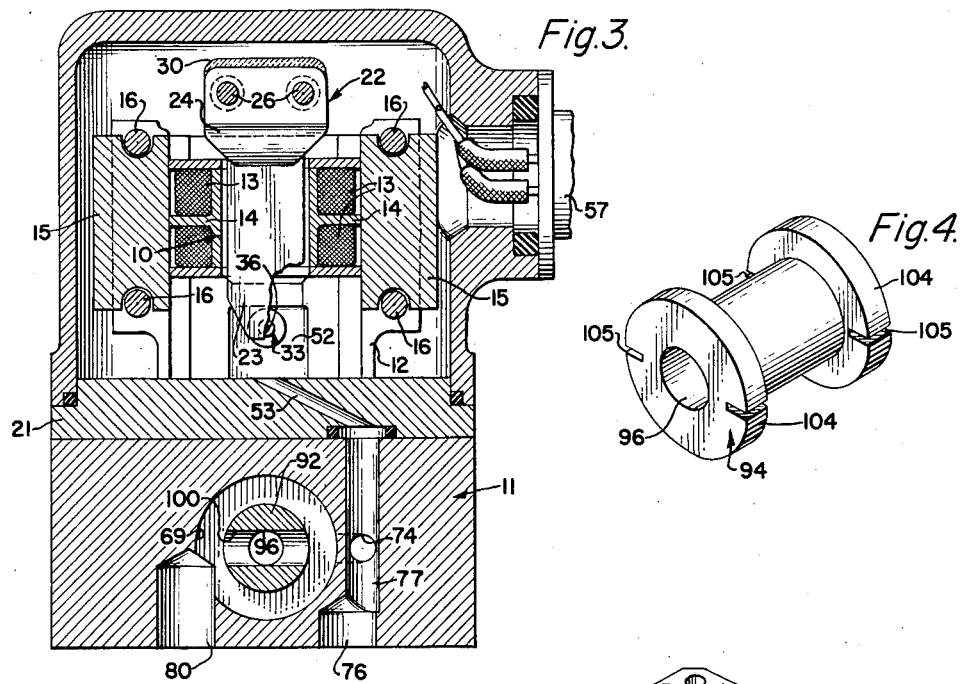

April 17, 1962 — J. M. KLOVER ETAL — 3,029,830
SERVO VALVE
Filed Nov. 6, 1957 — 3 Sheets-Sheet 3

INVENTORS:
JOHN M. KLOVER,
WILLIAM E. MELBER,
MORTON E. MOORE.
By: Theodore E. Bieber
Attorney.

United States Patent Office 3,029,830
Patented Apr. 17, 1962

3,029,830
SERVO VALVE
John M. Klover, Gardena, William E. Melber, Malibu, and Morton E. Moore, San Pedro, Calif., assignors to The Garrett Corporation, Los Angeles, Calif., a corporation of California
Filed Nov. 6, 1957, Ser. No. 694,857
9 Claims. (Cl. 137—82)

This invention pertains to valves, and more particularly to two-stage servo valves.

Various designs of servo valves exist but substantially all of them utilize a valve spool disposed in a precision machined sleeve assembly which is inserted and sealed in a valve body to control fluid communication between a series of valve ports formed in the valve body and the sleeve assembly in order to supply a pressurized fluid signal.

The above designs of servo valves normally utilize two stages. The first stage is usually an electro-fluid stage which converts an electrical input signal into an amplified fluid control force, while the second stage is a fluid stage which, as a function of the control force from the first stage, supplies the proper quantity and direction of fluid flow to the device being controlled by the servo valve. Thus, there are two major components of these servo valves, the first stage and the second stage and each must fuction properly in order to provide a successful servo valve. In these previous designs of servo valves, the first and second stages were built integrally, so that the complete valve had to be assembled, tested and adjusted as a unit. This type of construction makes final adjustment complex, since it is difficult to determine whether the first or the second stage requires adjustment.

All valves of this class, regardless of the means used to position the valve spool, require extreme precision in manufacture to provide reproducible and desired characteristics from one valve to the next. Also, most of the valves require rectangularly shaped valve ports with sharp corners, which are difficult to provide in a mass produced servo valve. In addition, it is often necessary to tailor the individual valves for a particular system. Since the valve gain depends both on the cross-sectional area of the valve ports and the response of the means used for positioning the valve spool, in order to change the valve gain one must rework the valve's first or second stage by disassembly of the valve and changing various parts or adjusting the mechanism used for positioning the valve spool. Furthermore, in order to increase the valve capacity, a new sleeve member and new valve body must be fabricated due to fixed dimensions of these parts.

In addition to the above difficulties, previous servo valves when operated in an acceleration switching manner utilized a flapper member for capping off the control nozzles to control spool position. This flapper usually consists of a single elongated member which tends to vibrate in resonance when striking the nozzle and thus does not properly cap off one of the control nozzles but instead vibrates between the two control nozzles.

The valve of this invention solves the above problems by providing a valve in which the first and second stages are constructed as separate units and then assembled to form a complete servo valve. This permits one to completely test and adjust the first stage and properly position the control nozzles prior to assembly of the first and second stages. Likewise, the second stage can be assembled, tested and adjusted prior to final valve assembly. Thus the first and second stages may be replaced and interchanged without retesting and adjusting the valve to obtain the desired performance. The invention also provides a valve body which is constructed of individual laminations, which are secured together to form a unitary structure. The use of individual laminations permits the forming of the valve ports having rectangular cross-sections with sharp edges and the passageways necessary for interconnecting the various valve ports by means of simple machining operations prior to assembly of the laminations.

The problem of tailoring the individual valves to any particular system is solved by a modified form of the invention in which the valve flow ports are formed on the valve spool and the control orifice of the valve spool positioning means installed in the ends of the hollow valve spool. The valve spool is also constructed from a plurality of individual cylindrical slugs which are secured together to form a complete valve spool. This permits the use of simple machining operations to form the rectangularly shaped valve ports. Thus one only has to substitute the new valve spool in order to vary valve gains over a wide range of requirements instead of forming a new valve body or a new valve sleeve assembly, or completely disassembling the valve in order to change the orifices. The use of a laminated valve body and a valve spool valve flow ports thereon permits the valve capacity to be increased by simply increasing the diameter of the bore in the valve body.

This invention also solves the problem of a flapper which tends to vibrate in resonance by supplying additional elongated members at each side of the flapper member in order to dampen the vibrations of the flapper member. In order to secure good dampening action the three members which form the flapper assembly are secured together at one end to form a unitary structure by means of welding or the like.

Accordingly, the principal object of this invention is to provide a unique method of constructing the valve body.

A further object of this invention is to provide a novel valve spool in which the valve ports are disposed on the spool.

A further object of this invention is to provide a unique valve body which is formed from a plurality of laminations which are bonded together to form a unitary structure.

Another object of this invention is to provide a unique valve spool having valve ports and control orifices disposed thereon, said spool being fabricated from a plurality of cylindrical members which are bonded together to form a unitary structure.

Another object of this invention is to provide a novel design of a servo valve body and spool which results in an easily constructed valve of uniform performance.

A further object of this invention is to provide a unique construction means for a two stage servo valve which permits the complete assembly, adjusting and testing of the first and second stages independently and then the assembly of the two stages to form a complete valve.

An additional object of this invention is to provide a unique construction for a flapper member used to control the opening of the control nozzles of the first stage of a servo valve which construction dampens the vibrations of the flapper member.

A still further object of this invention is to provide a novel construction of a servo valve which permits its capacity to be easily increased.

These and other objects and advantages of this invention will be more easily understood from the following detailed description of two preferred embodiments of the valve when taken in conjunction with the accompanying drawings in which:

FIG. 1 is a sectional view of the valve taken along line 1—1 of FIG. 2;

FIG. 2 is a vertical section of the valve taken along line 2—2 of FIG. 1, and showing the details of the torque motor and the valve body;

FIG. 3 is a vertical section taken along line 3—3 of FIG. 2;

FIG. 4 is a perspective view of one of the spool elements used in fabricating the valve spool;

FIG. 5 is an exploded perspective view of the individual laminations used for fabricating the valve body;

Figure 6:
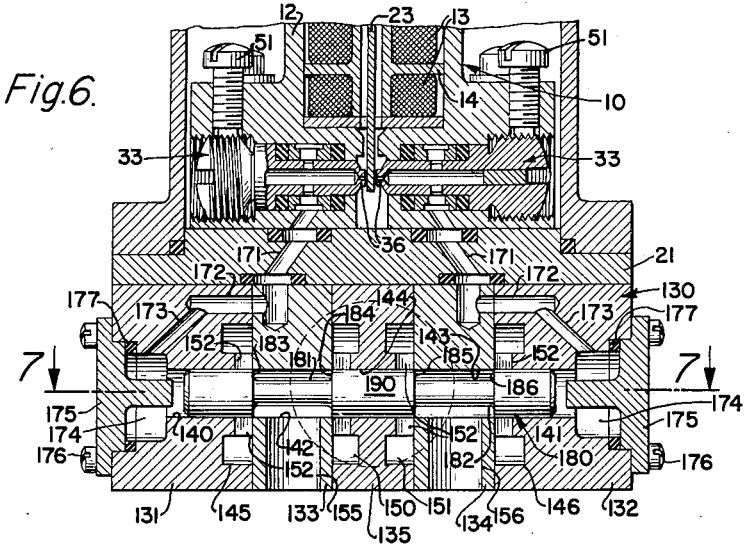
FIG. 6 is a partial vertical section of a modification of the valve shown in FIGS. 1–5.

While this invention is described in detail as embodied in a servo valve of the acceleration switching type, it will be apparent to those skilled in the art that it may be incorporated in other types of valves.

Referring now to FIGS. 1, 2, and 3, there is shown an electrohydraulic servo valve having a torque motor 10 which is secured to the valve body 11 by means of four machine screws 17. This construction permits both the torque motor and valve body to be completely assembled and tested as separate units, thus eliminating many possible sources of malfunctioning. The torque motor which is symmetrical about its centerline utilizes two identical pole pieces 12, which, in addition to serving as the pole pieces, serve as the structure for supporting the armature and remainder of the torque motor. Two coils 13 are wrapped around a suitable coil form 14 which in turn is held captive by the pole pieces 12. The two pole pieces are secured together to form the frame of the torque motor by means of machine screws 16 which pass through one of the pole pieces and thread into the other pole piece. Permanent magnets 15 are placed between the two pole pieces to complete the magnetic circuit and in addition serve as spacers to properly space the pole pieces. The two pole pieces are secured to the torque motor base 21 by means of four machine screws 20 which pass through the pole pieces and thread into the base member.

An armature assembly 22 is mounted at the top of the pole pieces with its flapper member 23 extending downwardly between the two spaced pole pieces. The armature assembly consists of flapper 23 and two dampening members 24 whose lower ends terminate short of the lower ends of the flapper. The flapper and the two dampening members are secured to two-angularly shaped mounting clips 25 by means of suitable fastening means such as rivets 26. To insure that the dampening members and the flapper member are securely fastened to the mounting clips their upper ends are secured together by means of a small weld 30. The complete armature assembly is secured to the top of the pole pieces by means of machine screws 31 which pass through the mounting clips 25 and thread into the pole pieces.

Mounted in bores 32 formed in the bottom portion of each of the pole pieces are nozzle members 33. The nozzle members are mounted in the pole pieces by means of enlarged threaded ends 34 which thread into a threaded portion of the bore 32. The remainder of each nozzle member has a reduced diameter 35 which terminates in a nozzle opening 36. Surrounding the outer surface of the reduced diameter portion 35 is a spacing ring 40 which axially spaces two resilient packing rings 41 which seal the outer surface of the nozzle members in the bore 32. The packing rings 41 are forced into a sealing engagement with the bore 32 by a shoulder 42 formed on the enlarged end of the nozzle member 33. The spacing ring 40 has an annular groove 43 formed on its surface and a plurality of radial openings 44 which communicate with the groove 43. The outer surface of each nozzle member 33 is also provided with an annular groove 45 and a plurality of radial openings 46. The groove 45 and the openings 46 are positioned on the nozzle member so that they will align with the similar openings in the spacing ring 40. When so aligned, these openings provide a means for introducing a pressurized fluid into the interior 50 of the nozzle member 33. After the exact position of each nozzle member 33 is determined with respect to the flapper member 23, it is locked in position by means of a set screw 51 whose lower end engages the enlarged threaded ends 34.

The space 52 between the lower ends of the two pole pieces is used as a drain for the two opposed nozzle openings 36 and is connected to the drain opening of the valve by means of a passageway 53 formed in the base member 21, as seen in FIG. 3. Pressurized fluid is supplied to the two nozzle members by means of passageways 54 which are also formed in the base member 21, as seen in FIG. 2, and communicate with the interior of each of the nozzle members by means of the radial passageways in the spacing ring 40 and the nozzle members 33. The engaging surfaces between the lower end of the pole pieces and the base member 21 adjacent the passageway 54 are sealed by means of packing rings 55 with similar packing rings being used to seal the surfaces of the base member 21 in the valve body.

The torque motor assembly 10 described above can be completely assembled on the motor base 21 as a separate unit. The unit can then be tested by connecting a source of fluid under pressure to the two passageways 54 in the base 21 to supply fluid under pressure to the control nozzles 33. Then the torque motor coils can be supplied with a symmetrical square wave form signal and the position of the nozzles 33 adjusted with respect to the flapper 23. Of course the fluid supplied to the two nozzles 33 must be metered by a flow orifice as will be explained below.

The valve body 11 consists of five laminations 60, 61, 62, 63 and 64 as seen in FIGS. 2 and 5. The end laminations 60 and 61 are provided with bores 65 and 66 respectively, while the intermediate laminations 62 and 63 are provided with bores 67 and 68 of substantially the same diameter. The center lamination 64 is provided with a bore 69 of larger diameter than the bores in the other laminations. Each of the end laminations 60 and 61 are provided with counterbores 70 and 71 formed in the surfaces 78 and 79 of the laminations 60 and 61, respectively. A groove 72 is formed in the surface 79 of the lamination 61 and connects with the counterbore 71 while a similar groove (not shown) is formed in the surface 78 of the lamination 60. Axial passageways 73, 74 and 75 are formed in the laminations 62, 64 and 63, respectively, and are spaced so that the ends of the passageways 73 and 75 intercept the grooves 72 in the laminations 60 and 61. A drain opening 76 is formed in the bottom of the center lamination 64 and connects with the passageway 74 by means of a passageway 77, as seen in FIG. 3. These passageways thus provide a means for connecting the two counterbores 70 and 71 to the drain opening 76 when the laminations are secured together to form a unitary structure. An inlet opening 80 is also formed in the center lamination 64 and connects with the bore 69 of the center lamination.

The spaces in the end laminations 60 and 61 outboard of the ends of the counterbores 70 and 71 are connected to the nozzle supply passageways 54 in the torque motor base by means of passageways 113, 114 and 115 which are formed in the end laminations 60 and 61 and the intermediate laminations 62 and 63 as is best seen in FIGS. 2 and 5. Two fluid outlets 120 and 121 are formed in the intermediate laminations 62 and 63 and are utilized for supplying the fluid flow signal to the opposite ends of an actuator 122 which is controlled by the servo valve. Of course, other devices which require a fluid flow signal may also be controlled by the valve.

The valve body laminations are assembled to form a unitary structure by any desired bonding means, such as by copper brazing them together. First a thin copper plate is deposited on their mating surfaces and then they are assembled in a complete assembly and aligned by placing a suitable size rod or tube member in the bores formed in the various laminations and in the aligning openings 81 which are also formed in the various laminations. The laminations are then clamped together and heated to a temperature sufficient to cause the copper on the adjacent surfaces to melt and braze the laminations together to form a unitary structure. After the valve body is cooled the rod or tube which was positioned to align the bores of the various laminations may be removed and the outer surfaces of the valve body finished. The rod which was placed in the aligning holes 81 is left in place inasmuch as it does not interfere with any of the passageways of the valve body. The use of a very thin copper plate for bonding the laminations together controls the tendency of the copper to plug any of the passageways or to round the sharp edges of the bores formed in the various laminations.

From the above description, it will be appreciated that this invention provides a very simple method for fabricating a valve body having sharp edges on the fluid control ports. In this construction, the sharp edges are formed by the surfaces of the intermediate laminations 62 and 63 adjacent the bores 65 and 66 as will be explained below. This method also provides a valve body in which all of the critical axial dimensions of the bore can be easily controlled. These dimensions are represented by the thickness of the intermediate and center laminations which are easily controlled by fabricating these parts on a surface grinder. The remainder of the passageways in the valve body can be formed in a drill-press or by other means.

A valve spool 90 is positioned in the aligned bores in the various laminations and consists of three cylindrical members 91, 92 and 93 with spool elements 94 and 95 disposed between adjacent cylindrical elements. The cylindrical element 92 has substantially the same length as the thickness of the center lamination 64 while each of the spool elements 94 and 95 have substantially the same overall length as the thickness of the intermediate laminations 62 and 63, respectively. The cylindrical elements and spool elements are bonded together to form a unitary structure by the same method which is used for bonding the laminations of the valve body together. The valve spool 90 is provided with a through bore 96 while the center cylindrical element is provided with opposed radial passageways 100. The radial passageways 100 permit pressurized fluid which is supplied to the inlet 80 to communicate with the interior of the valve spool. Orifice members 101 are threaded into the opposite ends of the bore 96 and have filter elements 103 which are preferably of a sintered metal type attached to their inner ends. The orifice members 101 should be matched so that each will permit a substantially identical amount of fluid to flow from each end of the valve spool. This is important since the flow of fluid from the ends of the valve is controlled by the torque motor to position the valve spool. Thus, if these orifices are not matched the unequal flow through them will tend to increase the fluid flowing to one end of the valve spool and unbalance the valve characteristics.

Referring to FIG. 4, it can be seen that each spool element 94 or 95 is provided with radial flanges 104 at opposite ends. Diametrically opposed slots 105 are formed in each of the flanges 104 and serve as the valve ports to control the flow of fluid from the inlet 80 to the two outlets 120 and 121 in the valve body.

The opposite ends of the bore are closed by means of end caps 110 which are secured in place by means of machine screws 111. A resilient packing ring 112 is provided for sealing the mating surfaces of the end cap 110 and the end laminations 60 and 61. The end caps 110 are also provided with axial projections 116 which act as stops to limit the travel of the valve spool 90. The travel of the valve spool must be limited in order to prevent its movement to one end of the bore which would render it inoperative.

When the above described servo valve is installed in a system and a source of fluid pressure connected to the inlet 80 and the outlet 76 is connected to a suitable drain, it will supply a hydraulic signal to the actuator 122 which varies linearly with the input signal of the coils 13, of the torque motor 10. The input signal to the coils 13 preferably has a square wave form whose symmetry varies as a function of the error signal. Any well known multivibrator which has a squarewave form output may be used for supplying this signal. When the squarewave form signal is exactly symmetrical, the flapper 23 will close off each of the nozzle openings 36 for the same length of time, thus venting each of the nozzles to the fluid drain for the same length of time. The nozzle members 33, of course, are supplied with pressurized fluid by means of the radial openings 100 and the center bore 96 of the valve spool. This pressurized fluid is supplied through the two matched orifice members 101 which are mounted in each end of the valve spool. Since the two nozzles 33 are supplied with the same metered quantity of fluid by means of the two orifice members 101, they will supply the same fluid flow signal to both ends of the valve spool. When an error signal is applied to the multivibrator, the symmetry of the squarewave form will change and the flapper 23 will close off one of the nozzle openings 36 for a longer period of time than the other nozzle opening 36. This will increase the flow of fluid into the space at one end of the valve spool while lowering the flow of fluid into the space at the other end of the valve spool, so as to drive the valve spool in an axial direction. When the valve spool moves in an axial direction, one of the slots or ports 105 adjacent the center cylindrical member 92 will communicate with the fluid pressure existing in the area surrounding the center cylindrical element 92. This will permit fluid pressure to flow into one of the outlets 120 or 121 which are connected to the bore 67 or 68 of the intermediate laminations and surround the spool element. The slot or port 105 on the opposite end of the other spool element will communicate with the drain by means of counterbores 70 or 71, so as to open one of the outlets 120 or 121 to the drain.

From the above description of the operation of the servo valve of this invention, it can be appreciated that it is an acceleration type of switching valve in which the valve spool 90 is switched by the fluid flow signals supplied by the flapper 23 in alternately closing off the nozzle openings 36. Even though the valve spool 90 is continually subject to a switching activity, the space at the opposite ends of the valve spool will act as an integrating volume to sum up all of the fluid flow signals received from the torque motor so that the final position of the valve spool over any finite period of time will be such as to supply the proper fluid flow to the actuator 122. Of course, if it is desired to reduce the movement of the valve spool 90 during switching, the frequency of the squarewave form signal supplied to the coils 13 can be increased which will decrease the flow of the fluid supplied to the two spaces at the opposite ends of the valve spool per cycle of the squarewave signal, thus reducing the magnitude of movement of the valve spool.

Also, from the above description of the operation of this valve, it can be appreciated that the valve gain is controlled by the cross-sectional area of the axial slots 105 in the spool members 94 and 95 and the cross-sectional area of the openings in the two matched orifice members 101. Thus, the valve gain can be changed by changing the dimensions of either one or both of these two items. Since, in the above valve both of these items are part of the valve spool, it means that only the valve spool must be changed to vary the valve gain. Of course, the amount of change possible in the valve gain has certain maximum and minimum limitations due to the diameter of the bore in the valve body and the size of the fluid and inlet openings.

The laminated construction of the valve body and the valve spool permits easy fabrication of these two parts while maintaining very sharp edges on the valve ports and the co-operating openings in the valve body. The valve ports, of course, are formed by the slots 105 in the spool members 94 and 95 of the cylindrical members. It will be appreciated that only a relatively easy machining operation is involved in forming the axial slots 105 in the spool members, thus they may be easily changed. After the elements are bonded together to form a complete valve spool 90, any minute quantity of the copper brazing material deposited in the slots 105 can be easily removed. The laminated structure of the valve body also provides sharp edges on the bores 67 and 68 in the cylindrical members 62 and 63, respectively, which control the opening of the ports formed in the valve spool 90. In previous valves using single piece valve bodies, the valve ports were always formed by broaching or some other equally difficult machine operation. Regardless of the care exercised during the machining operations of the valve body, it is practically impossible to secure sharp edges on the valve ports due to this method of manufacture. Furthermore, due to the tolerances required in some types of servo valves, the cost of finishing valve bodies was very high. Likewise, it will be apparent that all critical dimensions are easy to control and reproduce by surface grinding methods. These dimensions of course are the thickness of the intermediate laminations 62 and 63, the center lamination 64, and the spool elements 94 and 95, and center cylindrical element 93 of the valve spool.

Figure 7:
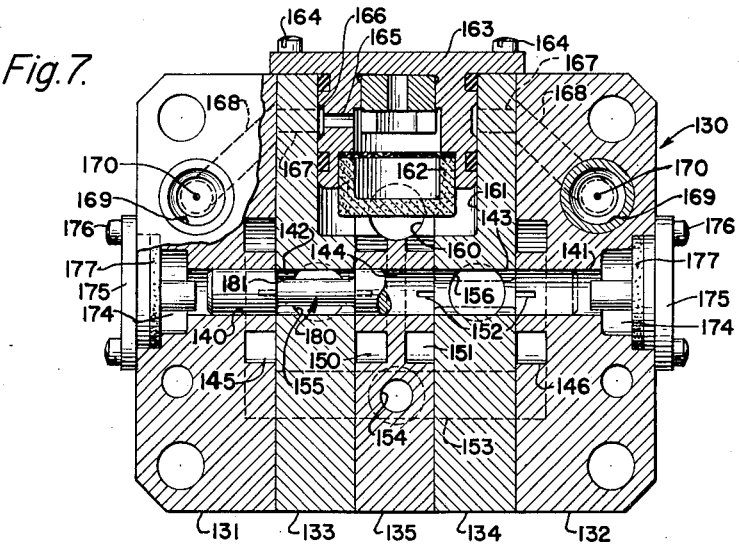
FIG. 7 is a horizontal section of the modified valve taken along line 7—7 of FIG. 6.

Referring now to FIGS. 6 and 7, there is shown a modification of the above described valve in which the valve ports are formed in the valve body instead of on the valve spool, as described above. This modification uses the identical torque motor 10 which was described above and operates in exactly the same manner except for the different location of the valve ports. The modified valve body 130 is formed of five laminations 131, 132, 133, 134 and 135 which are bonded together in the same manner as described above to form a unitary structure.

Inasmuch as the valve body is symmetrical about its center line, only one half of it will be described in detail. The left-hand lamination 131 is provided with a through bore 140. The lamination 131 is also provided with an annular recess in its flat surface which is juxtaposed from a surface of the intermediate lamination 133. The annular recess 145 communicates with the bore 140 by means of two diametrically opposed rectangularly shaped grooves or slots 152. These slots act as the valve ports and are formed with sharp corners especially at their initial opening end due to the flat surface of the intermediate lamination 133 which closes this side of the slot. The other end lamination 132 is provided with a similar annular recess 146 and a pair of diametrically opposed slots 152. The intermediate laminations 133 and 134 are each provided with through bores 142 and 143, respectively. The intermediate laminations are also provided with fluid outlets 155 and 156, respectively, for connecting the fluid pressure signals supplied by the valve to the actuator or other device which is controlled by the valve. The center lamination 135 is provided with annular recesses 150 and 151 on its opposed sides, each of the recesses 150 and 151 being provided with two diametrically opposed rectangularly shaped slots or grooves 152 which act as valve ports for providing communication between the annular recesses and the bore 144 formed in the lamination 135.

The two annular recesses 150 and 151 formed in the center lamination 135 are connected to a fluid pressure inlet opening 160, as shown in FIG. 7. The two annular recesses 145 and 146 in the end laminations are connected together by a passageway 153 which, in turn, communicates with the drain outlet 154. The five laminations of the valve body are bonded together to form a unitary structure with the bores of the various laminations being aligned so as to form a valve body having a through bore. The ends of the bore are closed by means of end caps 175 which are secured to the valve body by means of machine screws 176. The resilient sealing ring 177 is placed between the end cap and the adjacent surfaces of the end laminations to insure a tight closure at the end of the bore. The end caps 175 are also provided with axial projections similar to the projections 116 of end caps 110 to limit the valve spool travel. The spaces 174 at the opposite ends of the bore are connected to the nozzle members of the torque motor by means of passageways 171, 172, and 173 which are formed in the intermediate and end laminations of the valve body.

A valve spool 180 is disposed in the bore in the valve body and is provided with two relieved portions 181 and 182. The distance between the shoulders 183, 184, 185 and 186 on the relieved ports 181 and 182, respectively, should be exactly the same as the thickness of the intermediate laminations 133 and 134. Likewise, the length of the center portion 190 of the spool should be exactly the same length as the thickness of the center lamination 135.

The fluid pressure inlet opening 160 in addition to communicating with the annular recesses 150 and 151 also communicates with a bore 161 in which a filter 162 is mounted for filtering the fluid supplied to the nozzle members of the torque motor. The filter element is retained in place by means of a cap 163 which closes the end of the bore 161, and is secured to the valve body by machine screws 164. The fluid flowing through the filter 162 passes out radial openings 165 in the cap 163 into an annular groove 166 also formed in the cap 163. The fluid then flows through passageways 167 and 168 formed in the intermediate and end laminations respectively to the opposed nozzles of the torque motor. A pair of matched orifice members 170 are mounted in counterbores 169 formed in the end of the passageways 168 to meter the quantity of fluid flowing to the nozzle members 33 of the torque motor. The discharge from the matched orifice members 170 is conducted to the passageways 171 by means of passageway formed in the torque motor base 21, but not shown.

The above modified form of the valve operates in substantially the same way as the first described valve. When the squarewave form signal is applied to the torque motor, the output of the torque motor will switch the valve spool 180. The space 174 at each end of the valve spool will act as integrating volume so that the final position of the valve spool will be determined by the sum of all the fluid flow impulses supplied to the space 174 over a finite period of time. This final position of the valve spool will, of course, control the openings of the valve ports which are formed by the slots 152 in the center and end laminations. This modification of the valve is especially useful in those cases where large flow must be controlled, thus necessitating ports having a large area. The size of the valve ports which can be provided in the valve spool described in the previous embodiment is limited by the physical dimensions of the valve spool. While this modification is useful where large port sizes are required, it is not desirable where very small port sizes are desired due to the tendency of the ports to become plugged by the copper brazing material during the bonding operation. Since the ports are formed integrally of the valve body, it is practically impossible to remove the copper brazing material after the laminations have been bonded together.

While this invention was described in detail as embodied in an acceleration switching type of servo valve, many additional uses for its novel features in other types of valves will be apparent to those skilled in the valve art within its broad spirit and scope.

We claim:
1. A valve body having a central bore with spaced rectangular ports communicating with said bore comprising: a plurality of laminations having a central bore formed therein; a plurality of recesses formed in some of the surfaces of said laminations, said annular recesses being disposed to surround said central bores; a groove formed in said surfaces and connecting said annular recesses with said central bore, said groove having a rectangular cross-section; a fluid passageway formed in said body for providing communication between said recesses and the exterior of said valve body; an additional fluid passageway formed in said body for providing communication between the exterior of said valve body and said bore; and means for fastening said laminations together with said central bores being aligned, the surfaces of said laminations containing said annular recesses being juxtaposed to surfaces of said laminations free of said annular recesses.

2. An electrohydraulic servo valve comprising: a valve body formed of a plurality of laminations having a central bore formed therein; a plurality of annular recesses formed in some of the surfaces of said laminations, said annular recesses being disposed to surround said central bores; a plurality of grooves formed in said surfaces and connecting said annular recesses with said central bore; a passageway formed in said valve body for providing communication between said annular recesses and the exterior of said valve body; an additional passageway formed in said valve body for providing communication between said central bore and the exterior of said valve body; means for fastening said laminations together with said central bores being substantially aligned, the surfaces of said laminations containing said annular recesses being juxtaposed to surfaces of said laminations free of said annular recesses; a valve spool having at least one land formed thereon and disposed in said aligned central bores; means responsive to an electrical signal for applying a force proportional to said signal to the ends of said spool to move the spool whereby said land may control communication between said central bore and said grooves.

3. A valve spool for a servo valve utilizing fluid flow impulses applied to the ends of the spool to position the spool to control fluid communication between a plurality of spaced passageways communicating with the bore in which the spool is mounted comprising: at least a pair of cylindrically shaped members having a through bore; a spool-shaped element disposed between pairs of cylindrical members, said spool element having a radial projecting flange at each end and a through bore; at least one axial slot formed in one of the flanges of said spool element; a radial passageway formed in one of said cylindrical members to provide communication between said through bore and the bore in which the spool is mounted; orifice means mounted in said through bore on opposite sides of said radial passageway; and means for securing said spool element and said cylindrical members together to form a unitary structure.

4. A servo valve comprising: a valve body formed from five flat plate laminations bonded together by metallic means; the two intermediate and two end plates having aligned central bores of substantially the same diameter; and the center plate having a bore of enlarged diameter; a counterbore formed in the surface of each end plate adjacent said intermediate plates; a fluid pressure supply passageway formed in said center plate and communicating with the bore in said center plate; first passage means for connecting the counterbore in each end plate to a fluid drain; second passage means formed in each intermediate plate for connecting the bore of each intermediate plate to a device to be controlled by said servo valve; a valve spool disposed in the aligned bores of said flat plates; end caps for closing the ends of the bore in said end plates to form a chamber at each end of said valve spool; said valve spool consisting of three cylindrical slug elements and two spool elements bonded together to form a unitary structure; said spool elements having substantially the same length as the thickness of said intermediate plates and in addition having a radial flange at each end; an axial slot formed in each flange of said spools; and electromagnetic means for varying the fluid flow to each of said chambers in response to an electrical error signal.

5. A servo valve comprising: a valve body formed from five flat plate laminations bonded together by metallic means; the two intermediate and two end plates having aligned central bores of substantially the same diameter; and the center plate having a bore of enlarged diameter; a counterbore formed in the surface of each end plate adjacent said intermediate plates; a fluid pressure supply passageway formed in said center plate and communicating with the bore in said center plate; first passage means for connecting the counterbore in each end plate to a fluid drain; second passage means formed in each intermediate plate for connecting the bore of each intermediate plate to a device to be controlled by said servo valve; a valve spool disposed in the aligned bores of said flat plates; end caps for closing the ends of the bore in said end plates to form a chamber at each end of said valve spool; said valve spool consisting of three cylindrical slug elements and two spool elements bonded together to form a unitary structure; said spool elements having substantially the same length as the thickness of said intermediate plates and in addition having a radial flange at each end; an axial slot formed in each flange of said spools; a bore formed in said valve spool; a radial passageway formed in the center slug element of said valve spool for providing communication between the bore of said center lamination and the bore of said valve spool; an orifice means mounted in each of the end slug elements of said valve spool; fluid control passageways formed in said valve body for connecting the chambers at each end of said valve spool to an electromagnetic fluid flow control means; said electromagnetic control means varying the fluid flow to the chambers at each end of the valve spool in response to an error signal to position said valve spool.

6. A servo valve comprising: a valve body formed of five flat plate laminations having a through bore; means for bonding said laminations together to form a unitary structure with said through bores aligned; each end lamination having an annular recess formed in the surface juxtaposed from the intermediate laminations; a port having a rectangular cross-section formed in said surface of the end laminations for connecting the annular recess to the through bore of the end laminations; a fluid passageway formed in each intermediate lamination for providing communication between the through bore of the intermediate laminations and the exterior of said valve body; additional annular recesses formed in both surfaces of the center lamination and additional ports having rectangular cross-sections formed in the surfaces of the center laminations for connecting the additional annular recesses to the through bore of the center sections; first passage means for connecting a source of fluid pressure to the additional annular recesses in the center lamination and second passage means for connecting the annular recess in the end laminations to a fluid drain; a valve spool disposed in the aligned bores of said laminations for controlling communication between said ports; end caps for forming closed chambers at each end of said valve spool; control fluid passage means formed in said valve body for supplying a control fluid flow to each closed chamber; and electromagnetic means for varying said control fluid flow in response to an error signal.

7. A valve body for a servo valve having a plurality of spaced rectangular shaped ports whose opening is controlled by a valve spool comprising: five flat plate laminations having a through bore; means for bonding said laminations together to form a unitary structure with the bores of said laminations aligned; a first annular recess formed in the surface of each end lamination juxtaposed from the intermediate lamination; a first rectangular shaped port passageway formed in each of said surfaces of said end laminations for providing communication between said first annular recesses and the bore of said end laminations; second annular recesses formed in opposite surfaces of said center lamination; second rectangular shaped port passageways formed in each of the surfaces of said center lamination for providing communication between said second annular recesses and the bore of said center lamination; a first fluid passageway formed in said unitary structure and communicating with said first annular recesses; a second fluid passageway formed in said unitary structure and communicating with said second annular recesses; and third and fourth fluid passageways formed in said unitary structure and communicating with the bore of said intermediate laminations.

8. A valve spool having ports for controlling communication between a source of fluid pressure and a pair of fluid outlets comprising: three cylindrically shaped members and two spool-shaped members bonded together to form a unitary structure with the spool members disposed between pairs of cylindrical members; a through bore formed in said unitary structure; a radial passageway formed in the center cylindrical member for providing communication between said bore and the exterior of the center cylindrical member; each of the spool members having a radial flange at each end, the diameter of said radial flanges being substantially the same as the diameter of the cylindrical members; an axial slot formed in each of said radial flanges; orifice means disposed in each of the end cylindrical members; and filter means disposed in said bore to filter the fluid flowing from said radial passageway through said orifice means.

9. A servo valve comprising: a valve body formed of a plurality of laminations, each of said laminations having a central bore; a plurality of counter-bores formed in some of the surfaces of said laminations; means for fastening said laminations together with said central bores substantially aligned, the surfaces of said laminations containing said counter-bore being juxtaposed to surfaces of said laminations free of said counter-bores; passage means formed in said valve body for providing communication between said counter-bores and the exterior of the valve body; additional passage means formed in said valve body for providing communication between said central bore and the exterior of said valve body; a valve spool disposed in the aligned bores of said laminations; end caps for closing the ends of the bore to form a chamber in each end of said valve spool; said valve spool consisting of a plurality of laminated cylindrically shaped members and spool elements bonded together to form a unitary structure; said spool elements having substantially the same length as the thickness of said laminations, and in addition having a radial flange at each end; an axial slot formed in each flange of said spool elements; and means for varying the fluid flow to each of said chambers in response to an error signal.

References Cited in the file of this patent

UNITED STATES PATENTS

| | | |
|---|---|---|
| 2,419,243 | Allen | Apr. 22, 1947 |
| 2,476,763 | Pettibone | July 19, 1949 |
| 2,503,447 | May | Apr. 11, 1950 |
| 2,517,061 | Von Stackelberg | Aug. 1, 1950 |
| 2,699,756 | Miller | Jan. 18, 1955 |
| 2,709,421 | Avery | May 31, 1955 |
| 2,729,751 | Westman | Jan. 3, 1956 |
| 2,742,924 | Harter | Apr. 24, 1956 |
| 2,747,611 | Hewitt | May 29, 1956 |
| 2,767,689 | Moog | Oct. 23, 1956 |
| 2,796,081 | Dannevig et al. | June 18, 1957 |
| 2,797,666 | Chubbuck | July 2, 1957 |
| 2,807,280 | Kittredge | Sept. 24, 1957 |
| 2,813,519 | Persson et al. | Nov. 19, 1957 |
| 2,827,067 | Healy | Mar. 18, 1958 |
| 2,834,097 | Eichenberg | May 13, 1958 |
| 2,836,154 | Lantz | May 27, 1958 |
| 2,889,815 | Lloyd | June 9, 1959 |
| 2,897,792 | Baltus et al. | Aug. 4, 1959 |
| 2,920,650 | Moog | June 12, 1960 |

UNITED STATES PATENT OFFICE
CERTIFICATE OF CORRECTION

Patent No. 3,029,830                              April 17, 1962

John M. Klover et al.

It is hereby certified that error appears in the above numbered patent requiring correction and that the said Letters Patent should read as corrected below.

Column 1, line 28, for "fuction" read -- function --; column 2, line 22, for "spool valve flow" read -- spool having valve flow --.

Signed and sealed this 16th day of October 1962.

(SEAL)
Attest:

ERNEST W. SWIDER                                 DAVID L. LADD
Attesting Officer                                     Commissioner of Patents